Oct. 13, 1953  H. ARMSTRONG  2,655,076
OPTICAL SIGHTING DEVICE
Filed March 20, 1950  2 Sheets-Sheet 1

Harold Armstrong
INVENTOR.

BY *Clarence A. O'Brien*
*and Harvey B. Jackson*
Attorneys

Oct. 13, 1953  H. ARMSTRONG  2,655,076
OPTICAL SIGHTING DEVICE
Filed March 20, 1950  2 Sheets-Sheet 2
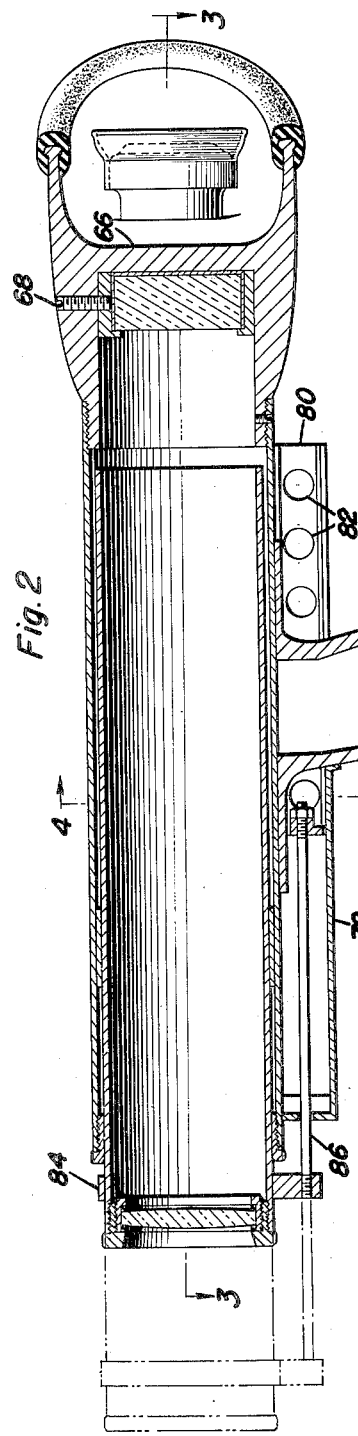
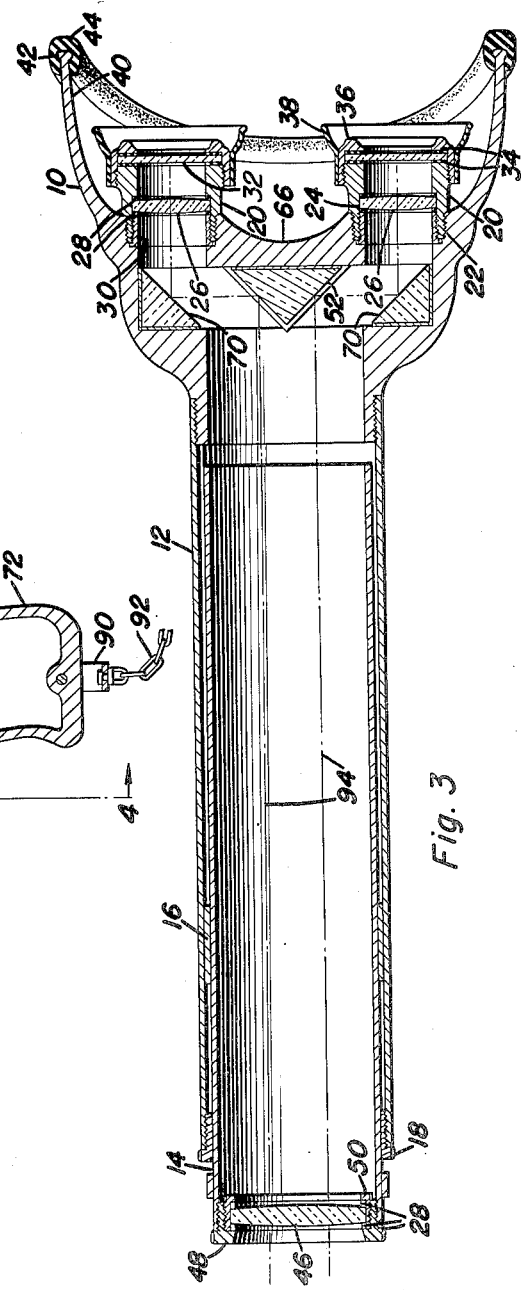
Harold Armstrong
INVENTOR.
BY Clarence A. O'Brien
and Harvey B. Jacobson
Attorneys Patented Oct. 13, 1953

2,655,076

UNITED STATES PATENT OFFICE 2,655,076

OPTICAL SIGHTING DEVICE

Harold Armstrong, El Paso, Tex.

Application March 20, 1950, Serial No. 150,685

4 Claims. (Cl. 88—33)

This invention relates to new and useful improvements in telescopic glasses and particularly to the type readily adapted to be used on moving vehicles.

An object of this invention is to provide a device readily adapted to be held and adjusted in one hand and which includes a novel lens and prism arrangement associated therewith.

A further object of this invention is to provide a novel means particularly adapted to be used on trains and the like where it will save time in heading out side tracks, observing signals, checking to see whether the flagman is aboard, and for other readily apparent reasons.

A still further object of this invention is to provide a telescopic device that is particularly useful wherever the operator needs to see objects at considerable distances but which can be held and operated in one hand.

Various other objects and advantages will be apparent from the detailed description to follow. In the description as well as in the claims, parts are at times identified by special names for convenience, but such nomenclature is intended to be as general in its application to analogous parts as the prior art will permit. My invention is clearly defined in the appended claims.

The best form in which I have contemplated applying my invention is illustrated in the accompanying drawings, in which:

Figure 2 is a vertical longitudinal sectional view taken substantially along line 2—2 of Figure 1;

Figure 3 is a horizontal longitudinal sectional view taken substantially along line 3—3 of Figure 2;

Figure 1:
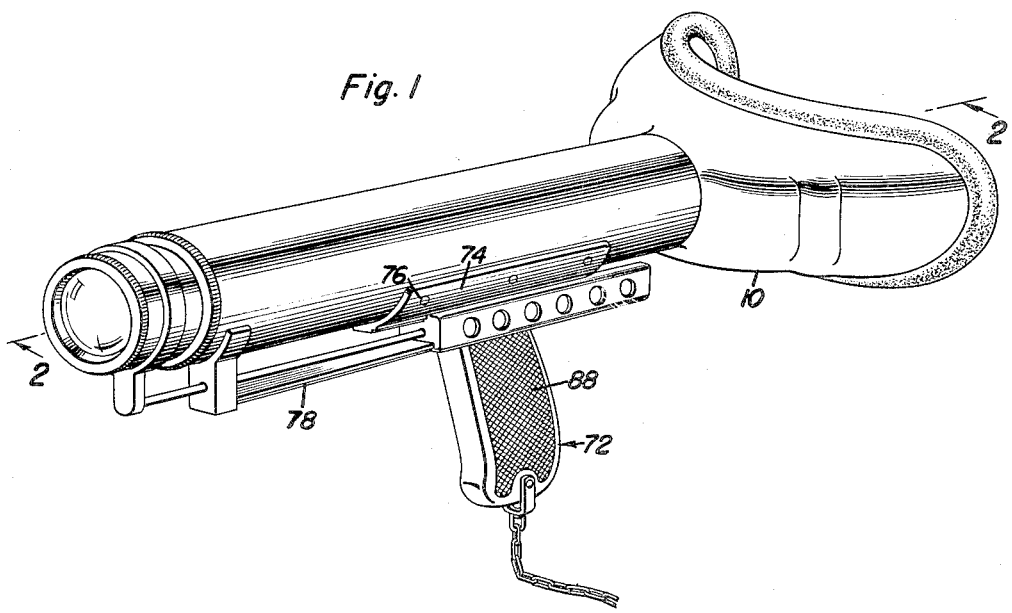
Figure 1 is a perspective view of the present invention.
Figure 4:
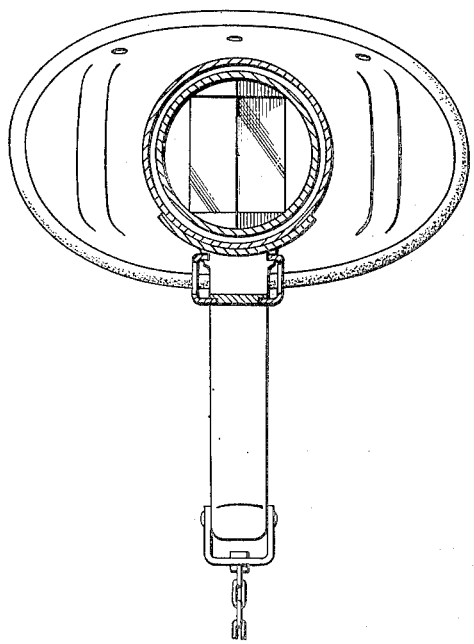
Figure 4 is a vertical transverse sectional view along line 4—4 of Figure 2; and, Figure 5 is an exploded perspective view of the particular prism holding device.

Referring more particularly to the drawings, in which like numerals represent like parts, numeral 10 refers to the prism frame to which is threadedly secured an outer tube 12. Within the outer tube 12 is an inner tube 14 mounted for longitudinal slidable movement within the outer tube by means of a sleeve 16 fixed to the outer tube and flange 18 threadedly secured to the outer tube for sealing the space between the tubes from moisture.

As seen best in Figure 3, within the prism frame is mounted the eyepiece members and the prism arrangement. The eyepiece members consist of tubular members 20 secured to the prism frame as by threads 22, and being internally counterbored as at 24 to receive the eyepiece lenses 26. Gaskets 28 of any suitable mounting substance, such as rubber, are provided on both sides of each lens 26, and threaded sleeves 30 serve to hold the lenses 26 in position in the tubular members 20. At the outer end of the tubular members 20, glass plates 32 are provided to protect the lenses, and are mounted with rubber-like gaskets 34 on each side for a purpose similar to that of gaskets 28, and are held in place by flanges 36. The flanges 36 have rubber-like cups 38 attached thereto which fit against the face of the viewer to keep out light coming from behind the device. The prism frame is formed with a cup-shaped end 40 provided with leather 44 or similar padded material around the edge 42.

Looking now at the other end of the device, the means for mounting the compound lens will be readily understood. The compound lens 46 has rubber-like gaskets 28 on each side and is held in tubular end member 48 by means of threaded sleeve 50. The tubular end member 48 is threadedly secured in the end of inner tube 14.

Figure 5:
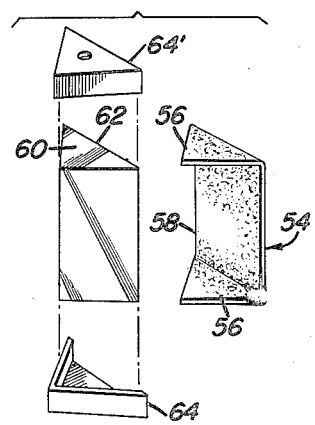

The prism arrangement will now be described. The center reflecting prism 52 is of right-triangular form and is mounted in a sheet metal member 54, shown best in Figure 5, having its right triangle ends 56 bent at right angles to the back 58, and adapted to slip over the end faces 60 and back faces 62. End members 64 are placed on each end of the prism 52 and the upper end 64' has a tapped hole through its top. The center prism is mounted with its back 62 to the cross wall 66 and a screw 68 engages the upper end 64' to hold the prism in place. Two other right triangular reflecting prisms 70 are provided to reflect the light rays, reflected by the center prism, into the eyepiece lenses 26.

The holding and adjusting means are best shown in Figures 1 and 2, wherein numeral 72 designates the handle which is secured to the outer tube 12 by the half sleeve 74 either riveted or screwed to the tube. A track 78 is secured to the handle and outer sleeve by weld or any other desired means. A slide 80 provided with holes 82 is mounted for longitudinal reciprocation on the slide 78. A band 84 is secured to the inner tube 14 at the outer end and is connected to the slide 80 as by a connecting rod 86.

The handle is provided with knurling 88, and a link 90 and chain 92 for attachment in the caboose or cab of a train or wherever else the device is desired to be used.

It is believed that the operation of this device will be readily apparent to one skilled in the art. The longitudinal adjustment of the inner tube with respect to the outer tube will provide focusing means and is easily accomplished with one hand by holding the handle and using a finger engaging a hole in the slide to reciprocate the same. The light rays 94 of the image will pass through the compound lens 46, and substantially one half of these rays will strike each face of the center reflecting prism and will be reflected towards each of the side reflecting prisms and will be reflected into the eyepiece lens. Thus the image is focused and conveyed to the viewer.

Some changes may be made in the construction and arrangement of the parts without departing from the real spirit and purpose of my invention and it is my intention to cover by my claims any modified forms of structure or use of mechanical equivalents which may be reasonably included within their scope without sacrificing any of the advantages thereof.

Having described the invention, what is claimed as new is:

1. A device comprising telescoping tubes having an optical system carried thereby, and means for longitudinally adjusting the telescopic tubes with respect to each other, said last named means including a handle fixedly secured to one of the tubes for supporting the device in juxtaposition to the operator's eyes, the other of the telescopic tubes being longitudinally movable with respect to the one tube, a track element rigidly connected to said handle and said other one of the tubes, and a finger operated slide reciprocably mounted on said track and operatively connected to said other one of the tubes whereby the focus of the system can be effected by movement of the slide, said finger operated slide including an elongated hollow element, the bottom wall of which is grooved for engagement with said track, and the side walls of which are provided with a plurality of longitudinally spaced finger receiving apertures whereby said slide and other tube may be adjusted with respect to the stationary handle.

2. A device comprising telescoping tubes having an optical system carried thereby, and means for longitudinally adjusting the telescopic tubes with respect to each other, said last named means including a handle fixedly secured to one of the tubes for supporting the device in juxtaposition to the operator's eyes, the other one of the telescopic tubes being longitudinally movable with respect to the one tube, a track element rigidly connected to said handle and said one of the tubes, and a finger operated slide reciprocably mounted on said track and operatively connected to said other one of the tubes whereby the focus of the system can be effected by movement of the slide, said track element including a flat elongated plate disposed in spaced parallel relation to the telescopic tubes and having one end angulated for attachment to said one of the tubes, said finger operated slide including an elongated hollow element, the bottom wall of which is grooved for engagement with said track, and the side walls of which are provided with a plurality of longitudinally spaced finger receiving apertures whereby said slide and other tube may be adjusted with respect to the stationary handle.

3. An optical sighting device comprising a pair of longitudinally adjustable outer and inner telescoping tubes having an optical system carried thereby, a handle secured to and extending radially from the outer of said tubes, a guide track secured at one end to said outer tube adjacent the outer end thereof and at its other end to said handle, a slide member slidably engaging said track and extending alongside of said handle parallel to said tubes, means operatively connected to said slide member and said inner tube to telescope the inner tube within the outer tube, and finger engaging means on said slide member adjacent said handle for moving the slide member along the track to longitudinally adjust the tubes to vary the focus of the optical system.

4. An optical sighting device comprising a pair of longitudinally adjustable outer and inner telescoping tubes carrying an optical system therein, a handle secured to and extending radially from the outer of said tubes, said handle being secured intermediate the ends of said outer tube, a guide track secured at one end to said outer tube adjacent the outer end thereof and at its other end to said handle, said track being spaced from and being parallel to said outer tube, a U-shaped slide member having a web slidably seating on said track and legs straddling said track and handle and guided thereby, a band secured to the outer end of said inner tube, a rod secured at one end to said band and at its other end to the web of said slide member, the legs of said slide member having finger openings therein whereby the slide member may be actuated from the handle to vary the focus of the optical system.

HAROLD ARMSTRONG.

References Cited in the file of this patent

UNITED STATES PATENTS

| Number | Name | Date |
| --- | --- | --- |
| 376,434 | Fox | Jan. 18, 1888 |
| 468,337 | Glocker | Feb. 9, 1892 |
| 535,862 | Sawyer | Mar. 19, 1895 |
| 1,476,290 | Fiske | Dec. 4, 1923 |
| 1,863,558 | Holder | June 21, 1932 |
| 2,005,014 | Tondreau | June 18, 1935 |